United States Patent
Lane et al.

(10) Patent No.: US 6,781,103 B1
(45) Date of Patent: Aug. 24, 2004

(54) METHOD OF AUTOMATICALLY FOCUSING AN OPTICAL BEAM ON TRANSPARENT OR REFLECTIVE THIN FILM WAFERS OR DISKS

(75) Inventors: Gale A. Lane, Menlo Park, CA (US); Steven W. Meeks, Fremont, CA (US)

(73) Assignee: Candela Instruments, Fremont, CA (US)

( * ) Notice: Subject to any disclaimer, the term of this patent is extended or adjusted under 35 U.S.C. 154(b) by 0 days.

(21) Appl. No.: 10/406,075

(22) Filed: Apr. 2, 2003

(51) Int. Cl.[7] .............................................. G02B 27/40
(52) U.S. Cl. .......................... 250/201.4; 250/559.45; 356/624
(58) Field of Search ................................ 356/399, 400, 356/401, 614, 622, 624; 250/201.2, 201.4, 559.29, 559.3, 559.31, 559.45, 559.46; 348/125, 126

(56) References Cited

U.S. PATENT DOCUMENTS

| | | | | |
|---|---|---|---|---|
| 4,281,897 A | * | 8/1981 | Fletcher | 356/434 |
| 4,558,949 A | * | 12/1985 | Uehara et al. | 356/614 |
| 4,725,722 A | * | 2/1988 | Maeda et al. | 356/624 |
| 4,736,110 A | * | 4/1988 | Awamura | 250/201.4 |
| 5,610,719 A | * | 3/1997 | Allen et al. | 250/201.4 |
| 5,633,721 A | * | 5/1997 | Mizutani | 356/401 |
| 5,825,469 A | * | 10/1998 | Nam et al. | 250/559.29 |
| 5,856,664 A | * | 1/1999 | Suzuki et al. | 250/201.2 |
| 6,091,075 A | * | 7/2000 | Shibata et al. | 250/559.44 |
| 6,137,561 A | * | 10/2000 | Imai | 356/400 |
| 6,433,858 B1 | * | 8/2002 | Suzuki | 250/201.4 |
| 6,621,060 B1 | * | 9/2003 | Nantel et al. | 250/201.4 |
| 2002/0158185 A1 | * | 10/2002 | Nelson et al. | 250/201.2 |

* cited by examiner

Primary Examiner—Michael P. Stafira
Assistant Examiner—Juan D Valentin, II
(74) Attorney, Agent, or Firm—Fenwick & West LLP

(57) ABSTRACT

A method is provided for automatically focusing a light signal on a surface of a substrate. The method is independent of the substrate material and is effective for both opaque and transparent substrates. A method is also provided for calibrating a system to allow for automatic focusing of a light signal.

41 Claims, 11 Drawing Sheets

Direction of Exposure of Position Sensitive Detector

METHOD OF AUTOMATICALLY FOCUSING AN OPTICAL BEAM ON TRANSPARENT OR REFLECTIVE THIN FILM WAFERS OR DISKS

FIELD OF INVENTION

The present invention relates to automatic adjustment of optical measurement equipment in order to position an object to be studied at the focal point of a focused beam.

DESCRIPTION OF BACKGROUND ART

Coated thin film disks are used in a variety of industries including the semiconductor and the magnetic hard disk industry. During manufacture and processing, such coated thin film disks require inspection for a variety of reasons. For example, coated thin film disks are routinely inspected to identify defects and particles on a surface of the disk so as to avoid use of the area near the defect. Coated thin film disks can also be inspected to identify topological variations on the surface. This type of inspection complements defect detection, for example, when evaluating a magnetic hard disk or semiconductor wafer fabrication process.

Many inspection applications for coated thin film disks involve use of focused optical beams, such as focused laser beams, to study the surface of the coated thin film disk. In focused optical beam techniques, it is typically desirable to place the surface of the coated thin film disk at the focal point of the beam. One current method for positioning the coated thin film disk at the focal point of the focused beam is manual calibration. Each time a coated thin film disk with a new thickness is measured the inspection system must be recalibrated to position the surface of the object at the focal point of the focused beam. Manual calibration is a time intensive task that reduces the throughput and productivity of a measurement tool.

The composition of the coated thin film disk provides an additional complication in focusing an optical beam on the surface of the disk. Thin film disks or wafers may be made from a wide variety of materials such as, aluminum, glass, silicon, gallium arsenide, lithium niobate, lithium tantalate, quartz or sapphire. Each of these materials has its own reflectivity characteristics. As a result, light signals reflected from these various materials will exhibit different properties. For example, a focused light beam reflected from a surface will exhibit a shift in the centroid of the reflected beam relative to the outer envelope of the beam that depends on the composition of the reflected surface. The shift in the centroid of a focused reflected beam depends on both the reflectivity versus angle of the material being investigated and the cone angle of the incident beam. An example of centroid shift is illustrated in FIGS. 1a–1c. FIG. 1a shows the beam intensity profile of an incident focused beam. The concentric circles in FIG. 1a schematically represent increasing beam intensity as one moves from the edge to the center of the beam. FIG. 1b shows the intensity profile for the focused beam after reflection from a first material. FIG. 1b shows that the centroid of the beam has shifted compared to the outer envelope of the beam. Because of the centroid shift, the maximum in beam intensity no longer corresponds to the center of the beam profile. As noted above, the amount of this centroid shift relative to the outer envelope of the beam will depend upon the optical reflectivity versus angle of the material under investigation as well as the cone angle of the incident optical beam. An example of this can be seen in FIG. 1c, which shows the intensity profile for a focused beam after reflection from a different material. This shifting of the centroid of a reflected focused beam as a function of optical material prevents one from using a simple bicell, quad cell or other position sensitive detector to determine the location of the beam and hence the focal position of the beam.

In addition to the problems associated with the centroid shift of a focused beam after reflection from a surface, some thin film disk materials are at least partially transparent to optical wavelengths. This creates the potential for reflections from one or more secondary surfaces of a coated thin film disk, such as interfaces between coating layers or the backside of a transparent wafer or disk. These reflections from secondary surfaces further complicate the problem of determining when a focused light signal is focused on a desired surface.

What is needed is a method that allows an optical inspection tool to automatically calibrate the position of a thin film disk relative to the focal point of a focused beam. The method should allow for automatic focusing of a beam on a thin film disk independent of the reflective properties of the material being investigated. The method should also be effective for both transparent and non-transparent thin film disks or wafers.

SUMMARY OF INVENTION

The present invention provides a method for automatically focusing a light signal on the surface of a thin film disk or wafer. In an embodiment, a light signal is passed through a focusing lens and directed toward a surface of a thin film disk or wafer. The surface of the thin film disk, wafer, or other substrate is initially positioned at a distance beyond the focal length of the focused beam. Light reflecting off the surface of the substrate is spatially filtered and then received by a position sensitive detector, such as a bicell or quadrant detector. The position sensitive detector is configured so that the received light will straddle at least two elements of the position sensitive detector when the light signal is focused on the surface of the substrate. An output signal based on the intensities received by the detector elements of the position sensitive detector is generated as the surface is moved closer to the source of the focused beam. This continues until the difference between the intensities received by the detector elements of the position sensitive detector exhibits a mathematical critical point, such as a minimum value. At the mathematical critical point the surface of the thin film disk is a known distance away from the focal point of the beam. The spacing between the focal point and the surface of the thin film disk is reduced by the known distance. As a result, the focal point of the focused optical beam will coincide with the surface of the thin film disk or wafer.

The present invention also provides a method for determining a calibration distance for an optical measurement tool or other apparatus having a focused light source. In an embodiment, a light signal is passed through a focusing lens and directed toward a surface of a thin film disk, wafer, or other substrate. The surface of the thin film disk, wafer, or other substrate is initially positioned at a distance beyond the focal length of the focused beam. Light reflecting off the surface of the substrate is spatially filtered and then received by a position sensitive detector, such as a bicell or quadrant detector. The position sensitive detector is configured so that the received light will straddle at least two elements of the position sensitive detector when the light signal is focused on the surface of the substrate. An output signal based on the intensities received by the detector elements of the position sensitive detector is generated as the surface is moved closer to the source of the focused beam. This continues until the difference between the intensities received by the detector elements of the position sensitive detector exhibits a mathematical critical point, such as a minimum value. The position of the focused light source relative to the substrate at this mathematical critical point corresponds to a first calibration position having a first distance between the focused light source and the substrate. The relative positions of the substrate and the focused light source are then adjusted until the light signal from the focused light source is focused on the surface of the substrate. This position corresponds to a second calibration position having a second distance between the focused light source and the substrate. The difference between the first and second distances corresponds to the calibration distance.

DETAILED DESCRIPTION OF THE INVENTION

Figure 1:
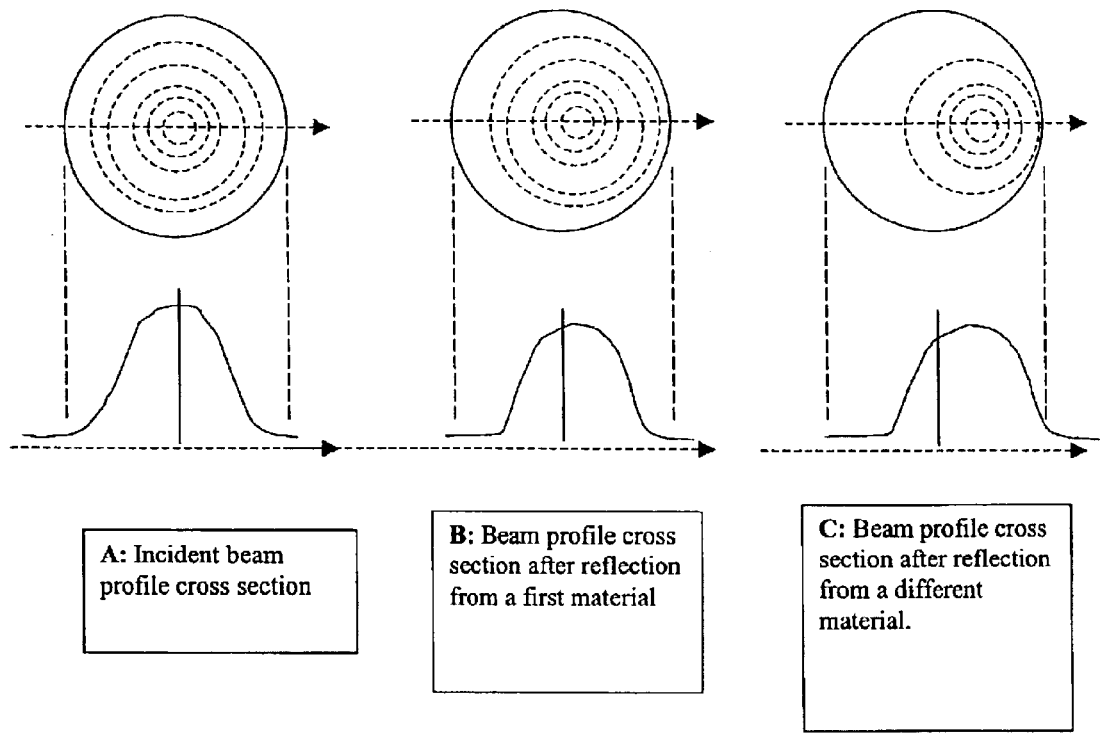
FIG. 1 is a schematic of the intensity profile for a focused incident beam and intensity profiles of the beam after reflection from surfaces composed of two different materials.

Embodiments of the present invention are now described with reference to the accompanying figures, where like reference numerals indicate identical or functionally similar elements. Also in the figures, the left most digit of each reference numeral corresponds to the figure in which the reference numeral is first used.

Figure 2:
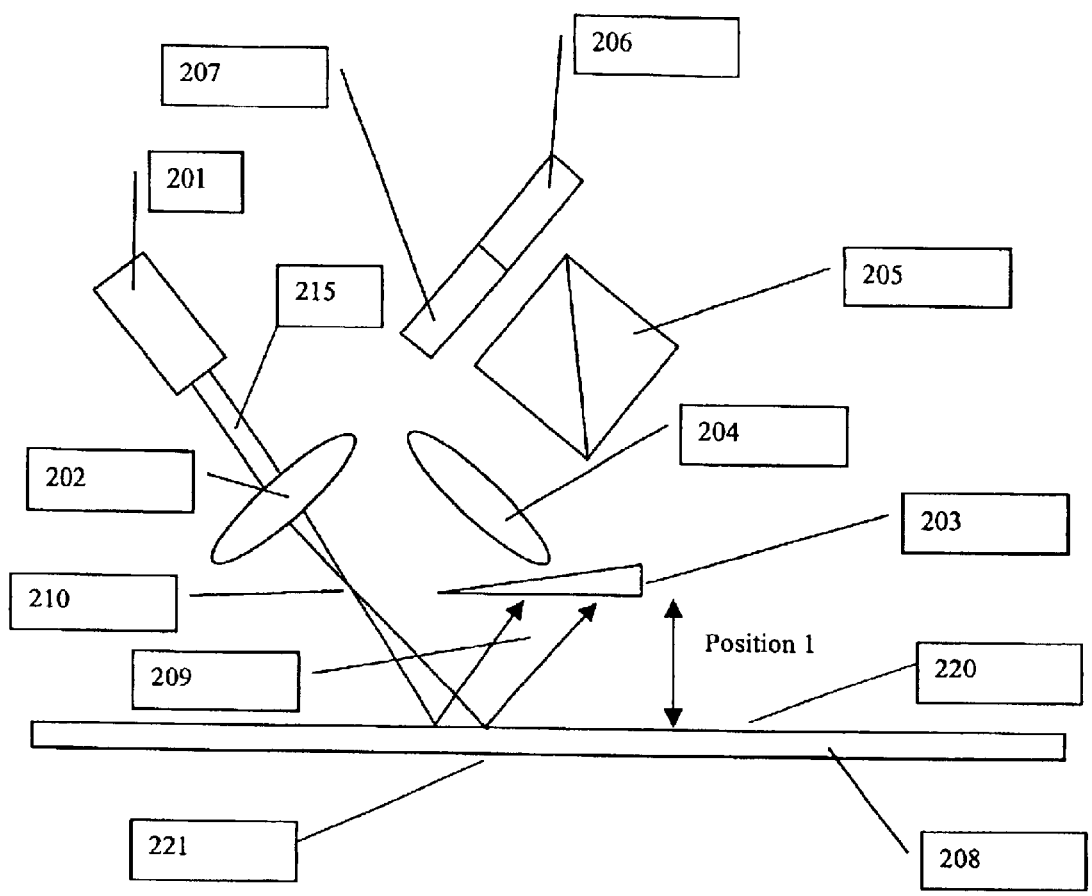
FIG. 2 is a schematic illustration of an optical measurement device with an optical head that is far above its focus position

FIG. 2 depicts an apparatus suitable for carrying out an embodiment of the present invention. FIG. 2 shows a light source 201 that generates a beam or light signal 215. In an embodiment, light source 201 is a laser diode, such as the model RLD65MZT1 or RLD-78MD laser diodes available from Rolm Corporation of Kyoto, Japan. Note that FIG. 2 depicts light signal 215 as a collimated beam which can be achieved by collimating a laser diode beam with a conventional collimating lens (not shown), such as the collimating lenses available from Newport Corp. of Irvine, Calif. Light signal 215 passes through a focusing lens 202 as it travels toward surface 220 of substrate 208. In an embodiment, lens 202 is a conventional focusing lens, such as those available from Newport Corp. Substrate 208 may be a thin film disk, a semiconductor wafer, a transparent wafer or disk, or another type of substantially planar substrate. In an embodiment, surfaces 220 and 221 of substrate 208 can be exposed surfaces of the bulk material substrate 208 is composed of. In another embodiment, surfaces 220 and 221 are thin layers residing on a bulk surface material, such as lubricant layers for a magnetic hard drive or epitaxial deposition layers on a semiconductor wafer. In still another embodiment, more than one layer of materials may reside between surfaces 220 and 221 and the bulk material of substrate 208. For clarity and convenience in the following description, surface 220 will hereinafter be referred to as top surface 220 while surface 221 will be referred to as secondary surface 221. Note that secondary surface 221 can represent a bottom surface of a thin film disk or wafer, or it can represent an interface between successive layers on a substrate.

Passing light signal 215 through lens 202 results in a converging beam focused on focal point 210. The distance between lens 202 and focal point 210 will vary depending on the type of lens employed. In the position shown in FIG. 2, focal point 210 is located well above top surface 220 of substrate 208. As a result, the converging beam passes through focal point 210 and begins to diverge prior to reflecting off of top surface 220.

After reflection from top surface 220 of substrate 208, the reflected beam continues to diverge into reflected light signal 209. In FIG. 2, reflected light signal 209 strikes an optical spatial filter 203 and is blocked from reaching the receiving lens 204 and the remainder of the optics. As a result, no light reaches beamsplitter 205 or detector elements 206 and 207. In an embodiment, receiving lens 204 is another conventional collimating lens, such as those available from Newport Corp. In an embodiment, beamsplitter 205 is a conventional non-polarizing beam splitter, such as those available from CVI Laser Corp. of Livermore, Calif.

In FIG. 2, detector elements 206 and 207 are depicted as part of a bicell, with element 207 as the element closest to top surface 220 of substrate 208. In an embodiment, detector elements 206 and 207 comprise a conventional bicell detector, such as those available from Hamamatsu Corp. of Hamamatsu City, Japan. In another embodiment, elements 206 and 207 are elements in a quadrant detector. In still another embodiment, any position sensitive detector with a discreet boundary between detector elements may be used.

The apparatus depicted in FIG. 2 has been described in terms of its individual components. The light signal generation and detection components may also be referred to collectively as an 'optical head'. For example, in an optical inspection tool, an optical head can be constructed to allow all parts of the optical head to move together while maintaining fixed positions relative to the other components of the optical head.

Figure 3:
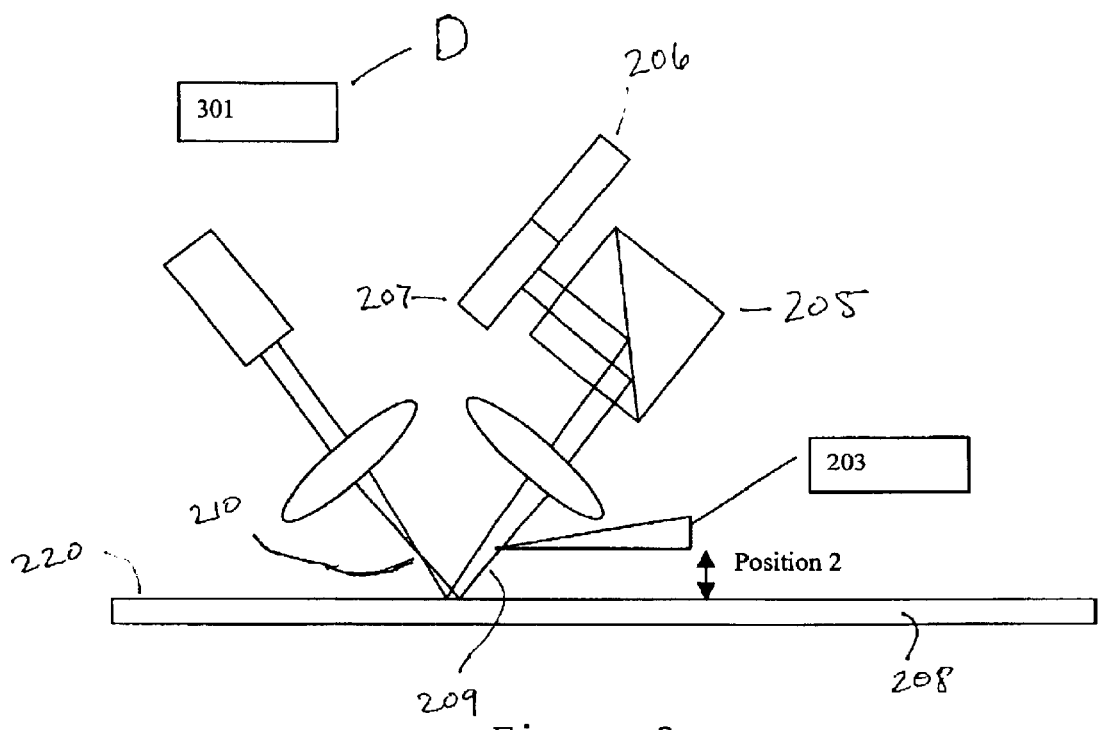
FIG. 3 is a schematic illustration of an optical measurement device with an optical head at the position where the bicell difference signal is at a minimum.

The position depected in FIG. 2 is denoted as Position 1. In this position the entire reflected beam 209 is blocked by spatial filter 203. As a result, no light signal is detected at detector elements 206 and 207. In FIG. 3, top surface 220 of substrate 208 has moved closer to focal point 210. This position will be referred to as Position 2. In an embodiment, focal point 210 is moved closer to top surface 220 by translating the optical head toward the substrate. In another embodiment, the substrate may be moved toward a stationary focal point 210. Other methods for adjusting the relative location of the substrate and the focal point will be apparent to those skilled in the art. Due to the closer proximity of focal point 210 and top surface 220 in FIG. 3, reflected beam 209 is now only partially blocked by spatial filter 203. The unblocked portion of the beam continues toward beamsplitter 205. The cross-section of the beam as it reaches beamsplitter 205 is shown at 301 in FIG. 3. Note that the cross-section 301 of reflected beam 209 is not round due to the portion of the beam blocked by spatial filter 203. Upon reaching beamsplitter 205, a portion of the beam is directed to bicell elements 206 and 207 while the remainder of the beam continues toward other detectors or optics. At Position 2, the majority of the beam impinges on detector element 207. Note that beamsplitter 205 is not necessary for performing the inventive method describe here. Beamsplitter 205 is included to depict a type of embodiment where a surface measurement will be taken after top surface 220 is positioned at the focal point 210.

Figure 4:
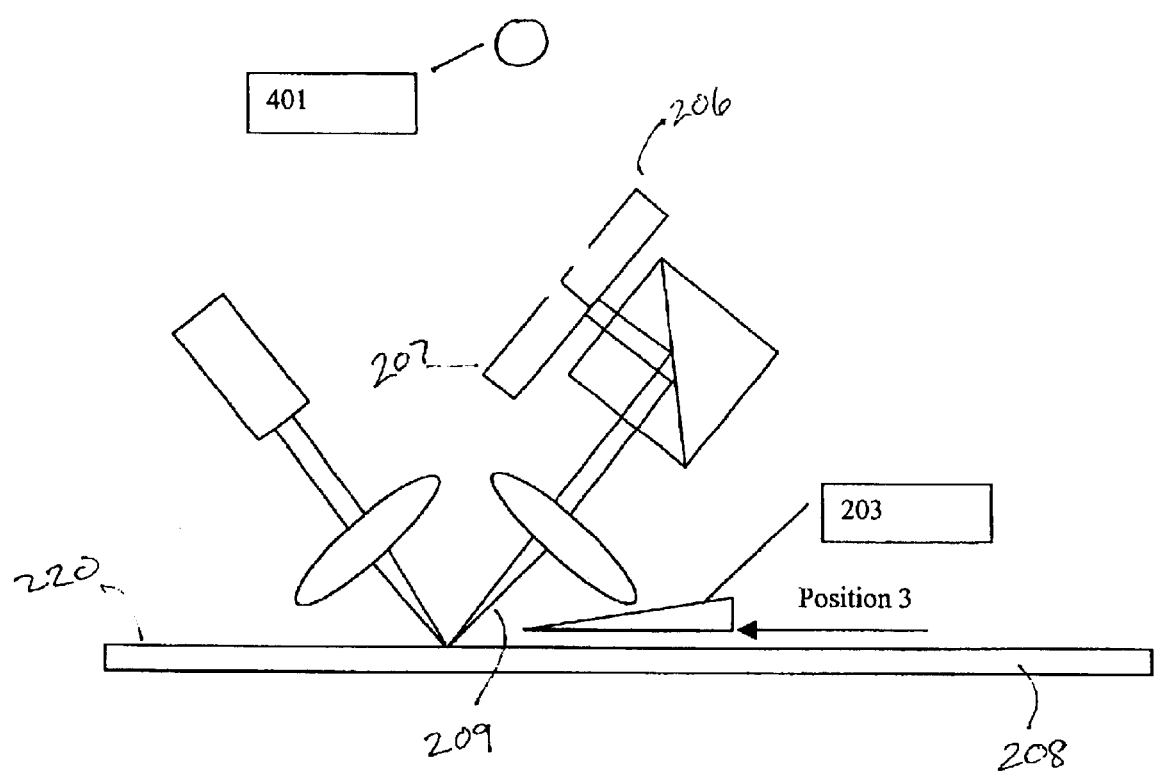
FIG. 4 is an illustration of an optical measurement device with an optical head that is at focus.

If substrate 208 is moved still closer to the optical head, the level of top surface 220 will coincide with the location of focal point 210. At this position, the incident light signal is focused on top surface 220. This position is referred to as Position 3 in FIG. 4. In this position, all of the intensity of light signal 209 reflected from top surface 220 will reach detector elements 206 and 207. None of reflected light signal 209 reflected from top surface 220 is blocked by spatial filter 203 and the beam shape will be round as shown in 401. Note that roughly equal amounts of light signal intensity reach both detector element 206 and detector element 207.

Spatial filter 203 fulfills several functions during the automatic focusing process. First, when top surface 220 is far from focal point 210 (as in Position 1), spatial filter 203 blocks all light intensity reflected from top surface 220 that would otherwise reach detector elements 206 and 207. As the distance between top surface 220 and focal point 210 is reduced, spatial filter 203 prevents any light intensity from reaching element 206 while increasing amounts of light reach element 207. As the distance between top surface 220 and focal point 210 is reduced further, light intensity reaches both detector element 206 and 207. Finally, at Position 3 the spatial filter does not block any light reflected from top surface 220.

Figure 5:
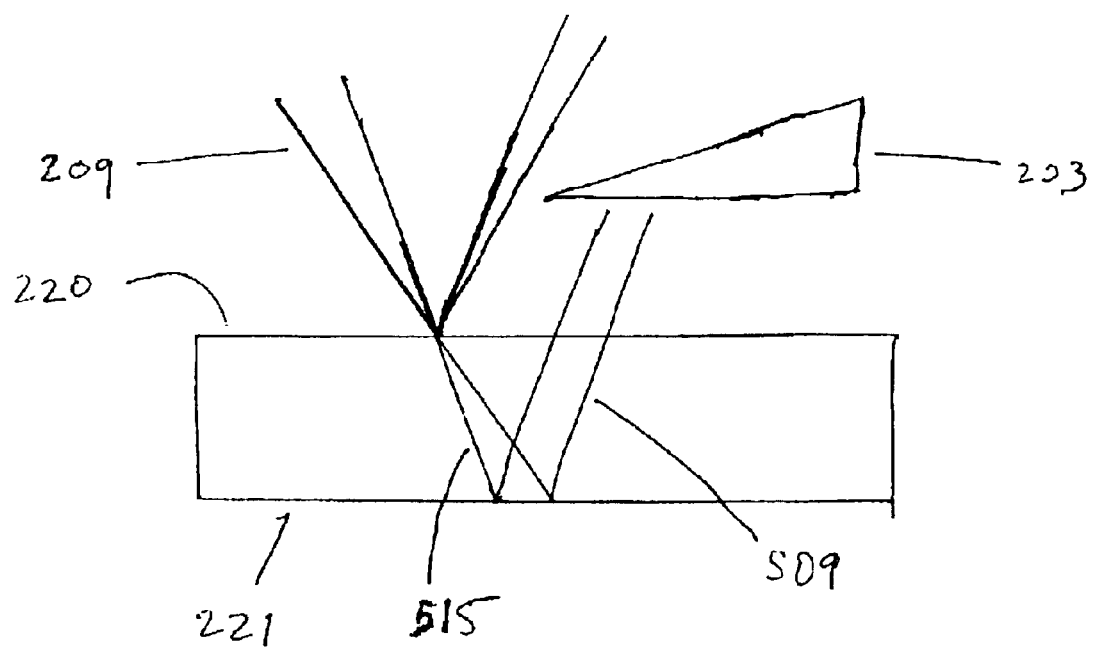
FIG. 5 schematically shows an example of use of the present invention in an embodiment involving a transparent substrate.

Additionally, spatial filter 203 blocks light reflected from other surfaces or interfaces. For example, if substrate 208 is made of a transparent material, spatial filter 203 blocks light that reflects off secondary surface 221. FIG. 5 provides a schematic example of how spatial filter 203 obstructs light from surfaces or interfaces below top surface 220. As noted above, at Position 2 light reflected from top surface 220 is still partially blocked by spatial filter 203. FIG. 5 shows an embodiment where a portion 515 of the focused light 209 incident on top surface 220 passes through the surface and reaches secondary surface 221. The light portion 515 reaching secondary surface 221 is reflected 509 and travels along a line roughly parallel to the reflected beam 209. Due to the additional distance traveled by light portion 515 prior to reflection from secondary surface 221, reflected portion 509 is entirely blocked by spatial filter 203.

FIGS. 2–5 depict embodiments of the present invention where spatial filter 203 is an independent structural element in the form of a pie-shaped wedge. In other embodiments, spatial filter 203 may have other shapes. In still other embodiments, a component serving another function fulfills the role of spatial filter 203. For example, a structural component of an optical measurement device, such as a part of the equipment housing, may serve as spatial filter 203. Other possible choices for how to implement spatial filter 203 will be apparent to those of skill in the art.

Figure 6:
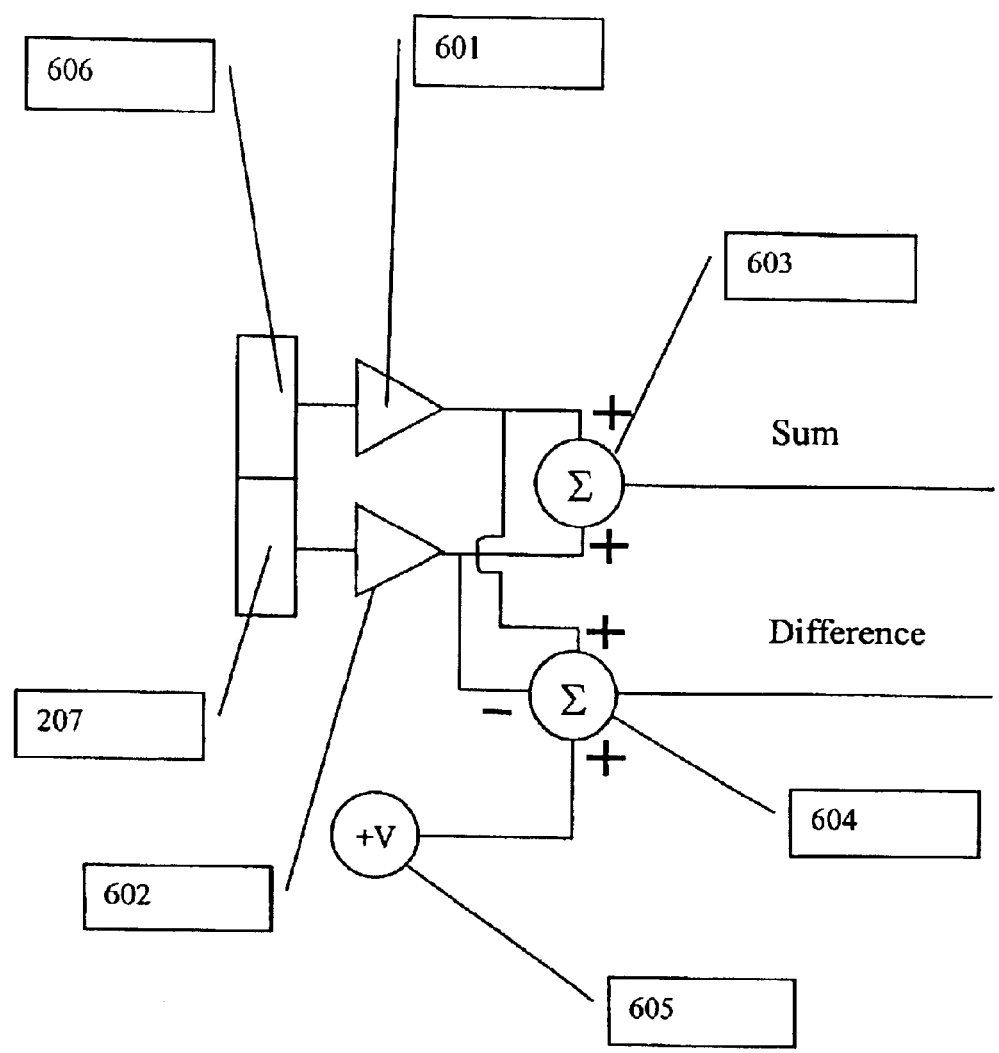
FIG. 6 is an illustration of electronics that can be used in carrying out an embodiment of the present invention.

By manipulating the output signals generated by a bicell or other position sensitive detector, the changes in the relative amount of light intensity falling on the elements of the position sensitive detector can be used to automatically position top surface 220 of substrate 208 at the focal point 210. FIG. 6 depicts electronics that can be used to manipulate the output signals from detector elements 206 and 207 in an embodiment of the present invention. When light intensity falls on either detector element 206 or 207, the detector element generates an output signal proportional to the intensity. In FIG. 6, these signals are amplified by pre-amps 601 and 602. The amplified signals are then used to create two values. The amplified signals are summed by element 603 to give the intensity (or sum signal) of the beam. The difference between the signals generated by detector elements 206 and 207 is also determined by element 604. In an embodiment, a positive bias voltage 605 of +V is added to the difference output generated by element 604. In an embodiment, the amplified output of detector element 207 is subtracted from the amplified output of detector element 206. In another embodiment, the amplified output of detector element 206 is subtracted from the amplified output of detector element 207. Elements 603 and 604 are conventional summing amplifiers available from Texas Instruments, Dallas, Tex.

Figure 7:
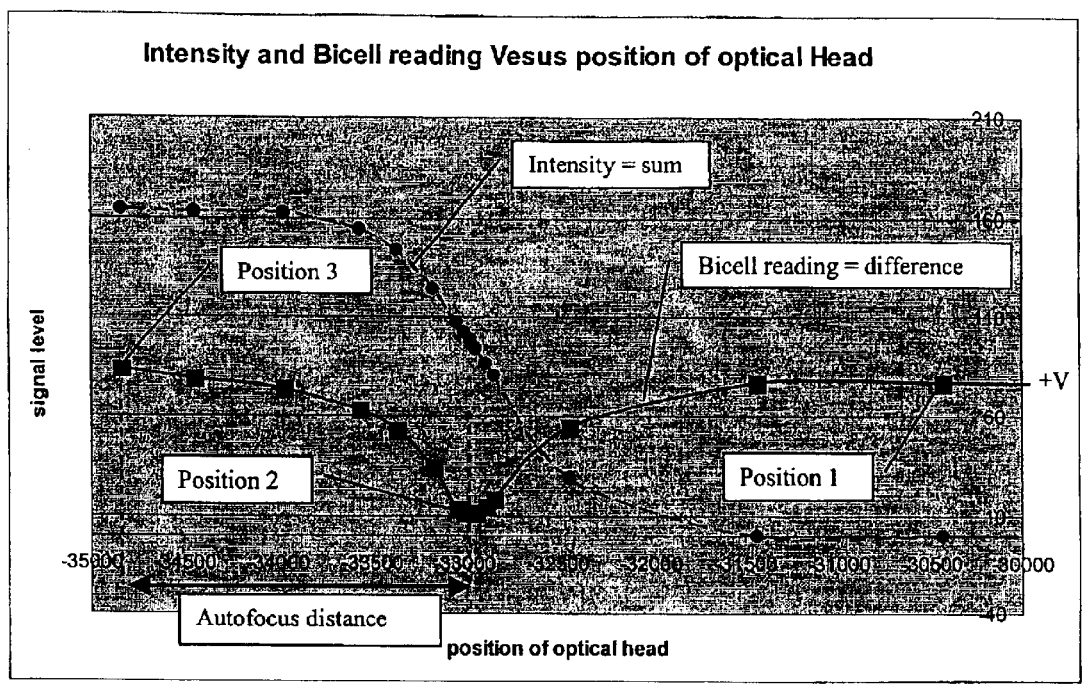
FIG. 7 is an illustration of the bicell difference and sum signals versus position of the head above the disk or wafer according to an embodiment of the present invention.

In an embodiment where element 604 subtracts the output of detector element 207 from detector element 206 and then adds a bias voltage 605 of +V, the signal manipulations described above can be used to automatically focus an optical beam on the surface of an object. When no optical signal reaches either detector element 206 or 207 of the bicell detector, such as when the relative positions of the optical head and the substrate correspond to Position 1, element 603 produces a sum signal of 0 while element 604 produces a value of +V. This is illustrated in FIG. 7 when the optical head is located at Position 1 (see FIG. 2). When the optical head is moved to Position 2 (see FIG. 3) the difference output is at a minimum as shown in FIG. 7. This is because the portion of the optical beam not blocked by spatial filter 203 impinges primarily upon detector element 207, leading to the largest possible difference between the intensity detected at elements 206 and 207. As top surface 220 moves still closer to focal point 210, the beam impinges more evenly on both elements 207 and 206 of the bicell. As a result the difference between 207 and 206 begins to diminish and when this is added to the +V bias the resulting difference output begins to increase. When the optical head is at its focal point at Position 3 (see FIG. 4 and FIG. 7) the difference output from element 604 is again substantially equal to +V, as the light intensity reaching detector elements 206 and 207 is roughly equal. As for the sum signal from element 603, FIG. 7 shows that the sum signal begins at substantially zero at Position 1, increases to about ½ its full value at Position 2, and achieves its full value at Position 3.

As described above, the signal corresponding to the difference in the intensities received at detector elements 206 and 207 shows a minimum at Position 2. In other words, the plot of the difference in intensities as a function of the distance between focal point 210 and top surface 220 exhibits a minimum at Position 2. Once lens 202 and focal point 210 are specified, the minimum in the difference signal will always occur at the same distance between the focal point 210 and top surface 220. The distance between Position 2 and Position 3 is a calibration distance that can be referred to as the Autofocus distance. The location of the minimum depends only on the type of lens 202 and the distance between focal point 210 and top surface 220 of substrate 208.

The Autofocus distance is independent of the material, reflectivity or transparency of the disk or wafer being tested. This is in part due to the fact that the mimimum in the difference signal (Position 2) occurs when the beam impinges substantially on detector element 207 while impinging only minimally (or not at all) on detector element 206 of the bicell. As a result, shifts in the centroid of a reflected beam caused by disk or wafer material effects will not affect the location of the minimum in the difference signal. Spatial filter 203 can be adjusted to eliminate reflections from the back side of transparent substrates which enables this invention to be used with optically transparent substrates.

Figure 8:
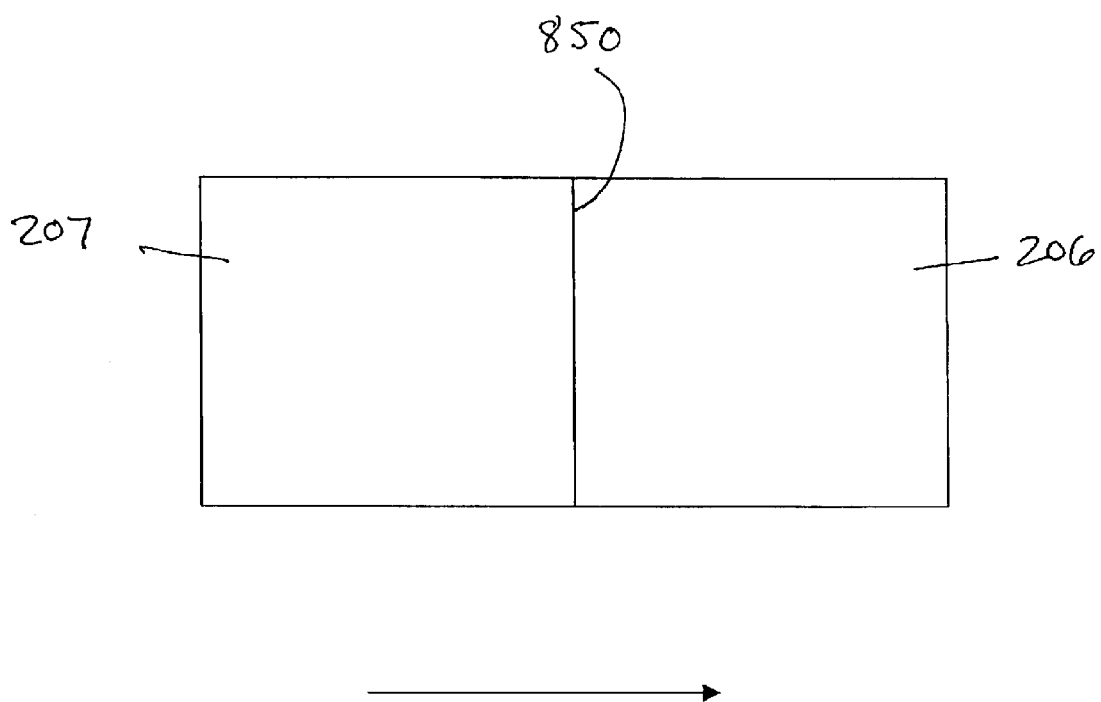
FIG. 8 is an illustration of a bicell detector showing the direction of exposure of the detector to light during operation of the present invention.

The dependence of the present invention on total beam intensity rather than the centroid of the beam can be further illustrated by considering how the reflected beam impinges on the detector elements as distance between the optical head and the surface is reduced. FIG. 8 schematically depicts the detector elements of a bicell, a position sensitive detector suitable for use in an embodiment of the present invention. The elements of the bicell are numbered 206 and 207, in accordance with the numbering used for the position sensitive detector in FIG. 2. As depicted in FIG. 8, detector elements 206 and 207 are shown as rectangular elements divided by a separator 850. In an embodiment, detector element 207 has a length of about 5 millimeters in the direction perpendicular to separator 850.

When the optical head is in Position 1 relative to the surface, no light impinges on either detector element 206 or 207. At Position 1, all of the reflected light is blocked by spatial filter 203. As a result, at Position 1 spatial filter 203 completely shadows detector elements 206 and 207. As the optical head is moved toward the surface (or vice versa), a position will be reached where reflected light begins to reach the position sensitive detector. The portion of the position sensitive detector that is accessible to reflected light will continue to expand as the distance between the optical head and the surface continues to decrease. In the embodiment depicted in FIG. 8, the reflected light will first impinge on the edge of detector element 207 that is farthest from separator 850. The accessible area will then expand to the right toward separator 850, eventually resulting in exposure of detector element 206 to the reflected light.

The centroid of the reflected beam will also move relative to the detector elements. Similar to the effect described above, the centroid will initially impinge on the edge of detector element 207 that is farthest from separator 850. The centroid of the reflected beam will move toward separator 850 as the distance is reduced between the surface and the optical head. However, when the system reaches Position 2, the centroid of the beam will still impinge on detector element 207. Because the minimum in the difference signal is detected based on the total intensity received at elements 206 and 207, the minimum is not influenced by variations in how the beam centroid is reflected from surfaces composed of different materials.

One factor that impacts the sensitivity of the present invention for achieving the proper focus is the relative size of the detector elements 206 and 207 versus the size of the reflected beam spot as it impinges on the detector elements. If the reflected beam spot is smaller than the size of the detector elements, the possibility exists that the entire beam spot could impinge solely on detector element 207. If this occurs, by definition the difference signal will exhibit a minimum for all positions where the entire beam spot impinges on detector element 207. As a result, the minimum in the difference signal would be poorly defined, as a range of positions would all show the same minimum value in the difference signal. Having a less well-defined minimum does not prevent the invention from working, but it does reduce the precision with which the invention selects the focus distance. In an embodiment, the size of the reflected beam 209 as it impinges on the position sensitive detector is of roughly the same dimension as detector element 207 along the direction perpendicular to separator 850.

Note that the presence of a minimum in the difference signal at Position 2 is a function of how the difference signal is calculated. In another embodiment, the output of detector element 206 is subtracted from the output of detector element 207. In this embodiment, the plot of the difference in intensities between as a function of the distance between focal point 210 and top surface 220 exhibits a maximum at Position 2. Note that the signal manipulations of detector element signals 206 and 207 described so far all result in the occurrence of a mathematical 'critical point' at Position 2. A mathematical critical point is a place in a mathematical curve where the first derivative is equal to zero. Those skilled in the art will recognize that other methods for manipulating detector element outputs 206 and 207 may be used in order to establish a mathematical critical point that corresponds to the location of Position 2. As for the bias voltage of +V, those skilled in the art will recognize that +V may be selected to correspond to any convenient value. For example, in an embodiment the value of +V is selected to be equal to the maximum possible output value of detector element 207 after amplification by pre-amp 602. In this embodiment, the difference signal calculated by element 604 will always have a positive value.

In the embodiments described above the sum signal calculated by element 603 provides a check on the operation of the apparatus when employing the present invention. At Position 3, the reflected beam is not blocked by spatial filter 203 and will fall roughly equally on both detector elements. Thus, at Position 3 the difference signal will have a value of about +V. However, the difference signal will also have a value of about +V at Position 1 when all of the light is blocked by spatial filter 203. The sum signal provides an easy way to distinguish these situations, as sum signal 603 will have a value of about 0 at Position 1 and a value of about +V at Position 3.

Those skilled in the art will recognize that once lens 202 has been selected, specifying the angle of incidence for the incident beam will usually be equivalent to specifying the focal point 210. In other words, any lens 202 will have a characteristic focal length. The focal point for a beam passing through the lens will occur at a distance from the lens equal to the focal length and along the optical axis of the lens. Typically a lens will be oriented so that a light beam passing through the lens is oriented along the optical axis of the lens. As a result, when the angle of incidence for the incident beam is specified, this also specifies the optical axis of the lens and thus the location of the focal point for light passing through the lens.

Because the Autofocus distance depends only on the choice of lens 202 and angle of incidence (or location of focal point 210), an optical measuring device may be pre-calibrated to determine the Autofocus distance. First, a lens to be used during optical measurements is selected.

Once the lens is selected, a series of measurements can be performed to determine the distance between Position 2 and Position 3 for various angles of incidence. In an embodiment, an optical measuring device may be pre-calibrated by determining the Autofocus distance for a set of desired incident measurement angles. In another embodiment, pre-calibration may consist of building a table of Autofocus distances at various angles of incidence. This table may then be used for interpolating the angle of incidence for any desired angle. Other ways of pre-calibrating an optical measurement tool in order to determine the Autofocus distance will be apparent to those of skill in the art. Note that once a system is calibrated, Autofocus distance values can be stored in memory associated with an optical measuring device. As a result, a user of an optical measurement device would only need to specify the desired measurement conditions, such as type of focusing lens and angle of incidence. Specifying these measurement conditions would result in identification of the Autofocus value, either by retrieving a stored value or by interpolation from a table of values. Other ways of identifying pre-determined values of the Autofocus distance will be apparent to those of skill in the art.

Figure 9:
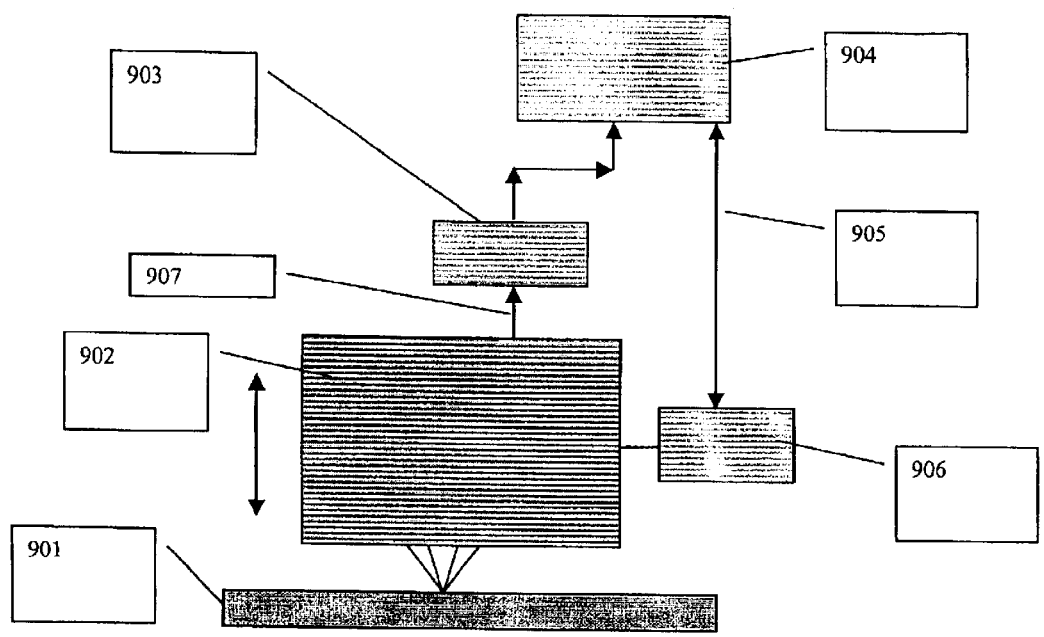
FIG. 9 is a block diagram of an apparatus suitable for carrying out an embodiment of the present invention.
Figure 10:
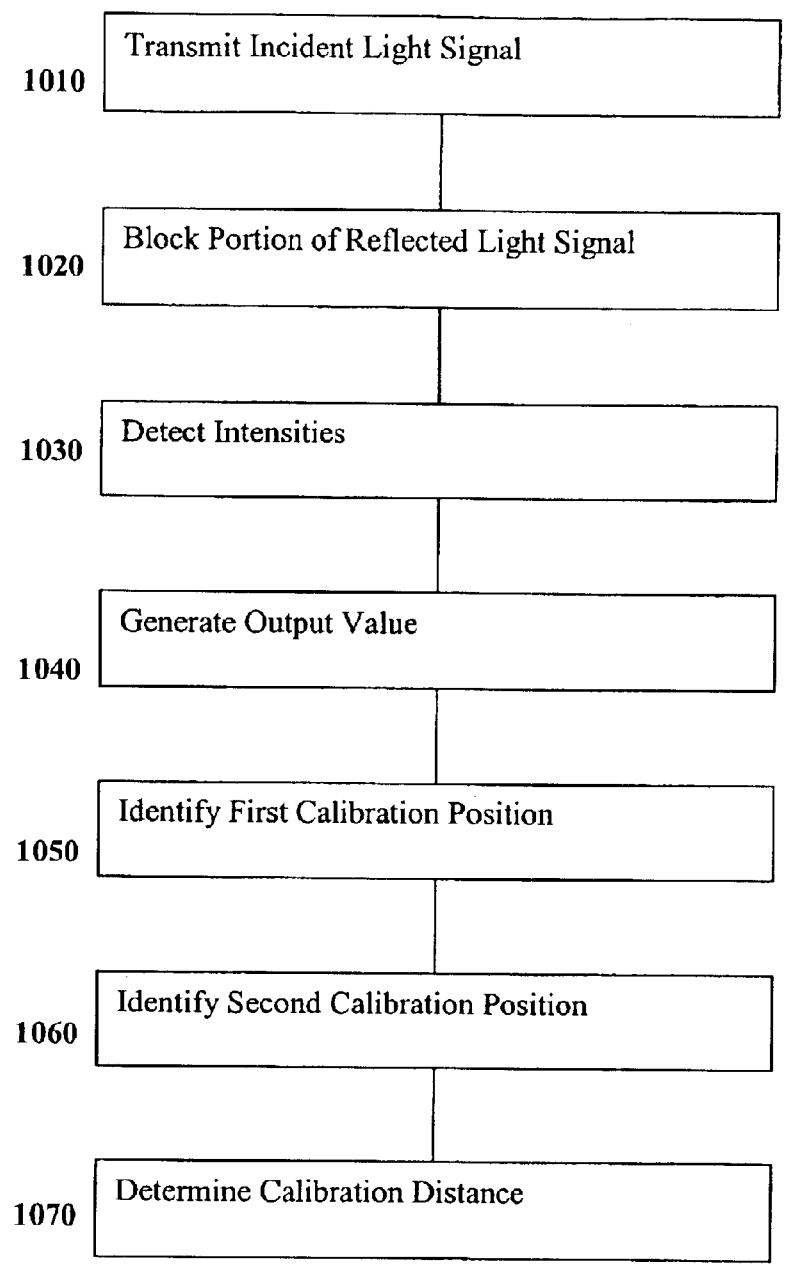
FIG. 10 depicts a flow diagram for an embodiment of the present invention.

FIG. 9 shows a block diagram of an embodiment of this invention when used to control the focus position of an optical head or apparatus. In FIG. 9, 901 is a substrate having a surface where an optical beam needs to be focused in order to perform a measurement or other task. Element 902 is the optical head, such as the system described earlier in connection with FIGS. 2–4, which may be moved up and down relative to the disk or wafer. Element 903 is a conventional analog to digital converter used to convert the bicell difference signal 907 to a digital signal. Element 904 is a personal computer which receives the digitized signal and controls a conventional external motor 906 for moving the optical head 902 up and down via a control line 905. The motor 906 positions the optical head 902 in response to the digitized bicell difference signal 907.

Based on the embodiments described in FIGS. 2–5 and FIG. 9, FIGS. 10 and 11 provide flow diagrams of examples of use of the Autofocus method according to various embodiments of the present invention. In an embodiment corresponding to the flow diagram in FIG. 10, a thin film disk, wafer, or other substrate is placed beneath an optical head or optical apparatus that includes a focused light source at a position corresponding to Position 1 to begin calibration of the system. A light signal from the focused light source is transmitted 1010 toward the surface of the substrate. At Position 1, all of the light reflected from the substrate is blocked 1020 by a spatial filter, such as spatial filter 203. As the substrate is moved toward the focused light source, a portion of the reflected light starts to reach the detector elements 206 and 207 of the position sensitive detector. As this happens, first and second intensities are detected 1030 corresponding to the unblocked portions of the light signal reaching the detectors 206 and 207. These intensities are used to generate an output value 1040, such as a difference signal. Eventually the output value will exhibit a minimum or other mathematical critical point, allowing for identification of a first calibration position 1050 corresponding to Position 2. Next, a second calibration position corresponding to Position 3 is identified 1060 by focusing the beam on a known artifact or particle on the surface of the substrate. In an embodiment, this is equivalent to aligning the focal point of the beam with the top surface of the substrate. Finally, the calibration distance is determined 1070 by calculating the difference in position between Position 2 and Position 3. In an embodiment, the calibration distance is calculated by determining the distance between the focused light source and the surface at both Position 2 and Position 3. The distances are subtracted from each other to determine the calibration distance. In another embodiment, another fixed point on an optical head may be identified. The distance between the fixed point on the optical head and the surface is then determined at both Positions 2 and 3, allowing for calculation of the calibration distance. Other methods for calculating the calibration distance will be apparent to those of skill in the art. Determining the calibration distance, also known as the Autofocus distance in this embodiment, finishes the required calibration for the system.

Figure 11:
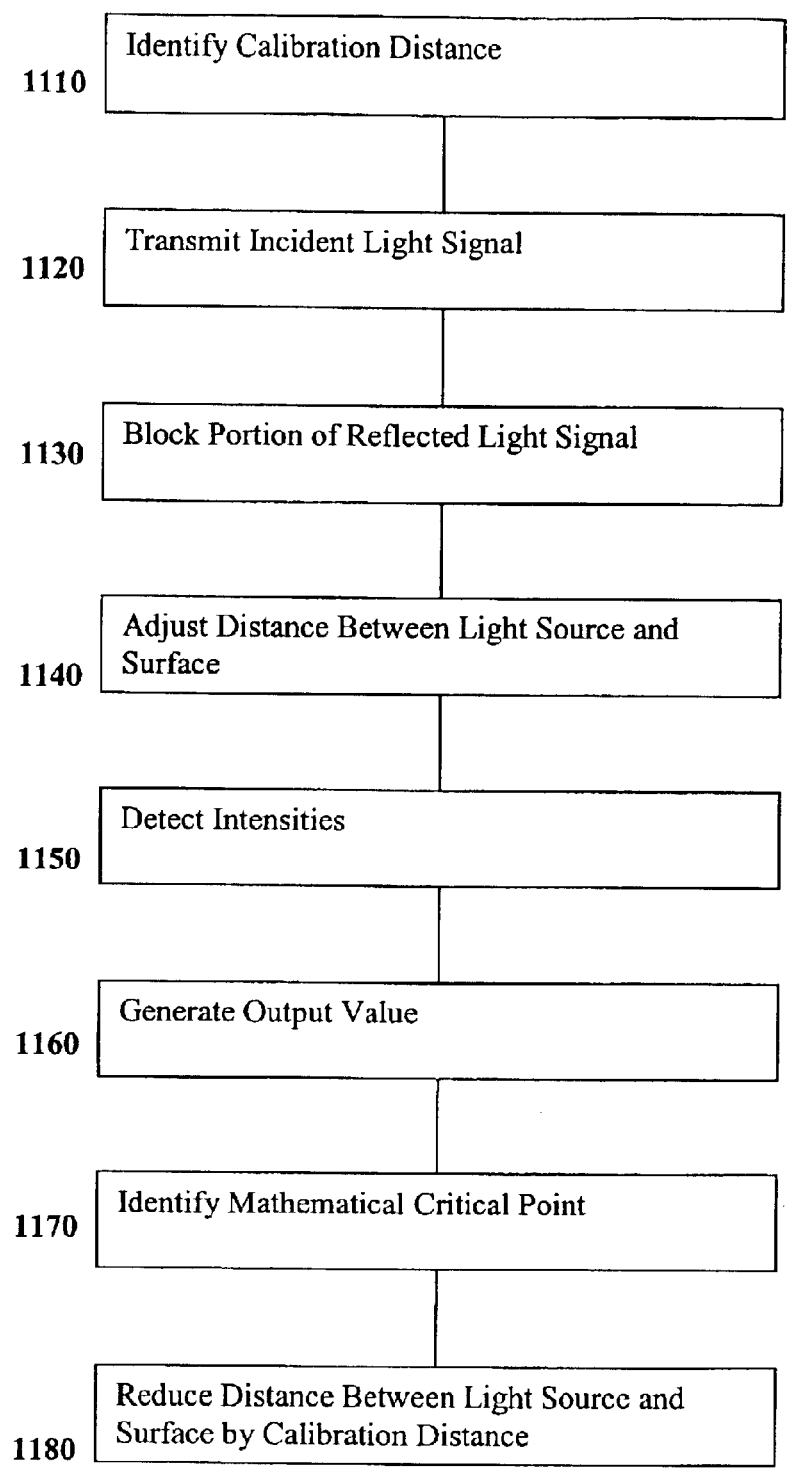
FIG. 11 depicts a flow diagram for another embodiment of the present invention.

Having identified the calibration distance 1110, in an embodiment the system can now automatically focus its optical beam on any substrate according to the flow diagram in FIG. 11. In an embodiment, another substrate is placed underneath the optical head or optical apparatus at a position corresponding to Position 1. An incident light signal from the focused light source is transmitted 1120 toward a first surface of the substrate. At this position, at least a portion of the light signal reflected by the substrate is blocked 1130 by a spatial filter. The position of the substrate relative to the focused light source is then adjusted 1140. As the distance between the substrate and the focused light source is adjusted 1140, first and second intensities 1150 are detected corresponding to the unblocked light intensity reaching the position sensitive detector elements. The first and second intensities are used to generate an output value 1160. Eventually, a mathematical critical point is identified 1170 in the generated output value, indicating that a position corresponding to Position 2 has been reached. From this identified position corresponding to Position 2, the distance between the substrate and the focused light source is reduced 1180 by the identified calibration distance (or Autofocus distance). The system is now ready to perform a measurement or other task on the surface of the substrate using the focused optical beam.

Note that the above working example assumes use of the same focusing lens and same angle of incidence for all uses of the focused beam. Those skilled in the art will recognize that additional calibration steps could be performed to allow for changes in the angle of incidence. Similarly, the system could be recalibrated after a change in the equipment used in the optical head.

The present invention may also be used to determine the thickness of disks or wafers. This can be accomplished by finding the location of the minimum in the bicell difference signal for a known thickness disk or substrate. The thickness of an unknown disk or substrate is then determined by remeasuring the position of the minimum in the bicell difference signal for the unknown thickness substrate. The difference in position between the location of the minimum for the known and unknown substrates is added to the thickness of the known thickness substrate to arrive at the thickness of the unknown substrate. The advantage of this process is that it is independent of the material, reflectivity or transparency of the substrate.

While the invention has been particularly shown and described with reference to a preferred embodiment and various alternate embodiments, it will be understood by persons skilled in the relevant various changes in form and details can be made therein without departing from the spirit and scope of the invention.

We claim:

1. A method for automatically focusing a light signal on an object, comprising:
    identifying a calibration distance;
    transmitting an incident light signal generated by a focused light source toward a first surface of an object;
    blocking at least a portion of a reflected light signal reflected from said first surface of said object;
    adjusting a distance between said focused light source and said first surface;
    detecting a first intensity at a first detector element corresponding to a first portion of the unblocked reflected light signal;
    detecting a second intensity at a second detector element corresponding to a second portion of the unblocked reflected light signal;
    generating an output value based on said first and second intensities;
    identifying a mathematical critical point in said generated output value, wherein said mathematical critical point corresponds to a first relative position of said focused light source and said first surface; and
    reducing a distance between said focused light source and said first surface at said first relative position by said calibration distance.

2. The method of claim 1, wherein reducing a distance between said focused light source and said first surface comprises translating said first surface toward said focused light source.

3. The method of claim 1, wherein reducing a distance between said focused light source and said first surface comprises translating said focused light source toward said first surface.

4. The method of claim 1, wherein reducing a distance between said focused light source and said first surface comprises:
    moving said first surface to a position relative to said focused light source corresponding to the critical point in the value of said generated difference signal; and
    translating said first surface toward said focused light source by said calibrated distance.

5. The method of claim 1, wherein identifying a calibration distance comprises receiving a previously determined calibration distance.

6. The method of claim 1, wherein identifying a calibration distance comprises retrieving a stored value from a computer memory.

7. The method of claim 1, further comprising blocking a second reflected light signal reflected from a secondary surface of said object.

8. The method of claim 1, wherein said focused light source comprises a laser diode.

9. The method of claim 8, wherein said focused light source further comprises a converging lens.

10. The method of claim 1, wherein generating an output signal based on said first and second intensities comprises:
    subtracting a first voltage signal corresponding to said first intensity from a second voltage signal corresponding to a second intensity; and
    adding a bias voltage to said subtracted signal.

11. The method of claim 10, further comprising:
    repeating said amplifying, subtracting, and adding steps after each adjustment of a distance between said focused light source and said first surface.

12. The method of claim 1, wherein the intensity of the second portion of the unblocked reflected light signal is zero.

13. The method of claim 1, wherein the mathematical critical point in the value of said generated output signal corresponds to a maximum value in said generated output signal as a function of distance between said focused light source and said first surface.

14. The method of claim 1, wherein the mathematical critical point in the value of said generated output signal corresponds to a minimum value in said generated output signal as a function of distance between said focused light source and said first surface.

15. The method of claim 1, wherein the first detector element and the second detector element comprise a bicell detector.

16. The method of claim 1, wherein the first detector element and the second detector element comprise detector elements of a quadrant detector.

17. The method of claim 1, wherein the first detector element and the second detector element comprise detector elements within a position sensitive detector.

18. The method of claim 1, wherein said object is a substantially planar substrate.

19. The method of claim 1, wherein said object is a thin film disk.

20. The method of claim 1, wherein said object is a semiconductor wafer.

21. The method of claim 1, wherein said object is a substrate that is at least partially transparent to said incident light signal.

22. The method of claim 1, wherein the steps of the method are performed in the order set forth in the claim.

23. A method for determining a calibration distance, comprising:
    transmitting an incident light signal generated by a focused light source toward a first surface of an object, wherein at least a portion of said incident light signal reflects from said first surface;
    blocking at least a portion of said reflected light signal;
    detecting a first intensity corresponding to a first portion of the unblocked reflected light signal at a first detector element;
    detecting a second intensity corresponding to a second portion of the unblocked reflected light signal at a second detector element;
    generating an output value based on said first and second intensities;
    identifying a first calibration position of said focused light source and said first surface corresponding to a mathematical critical point in said generated output value, wherein the distance between said focused light source and said first surface at the first calibration position is a first distance;
    identifying a second calibration position of said focused light source and said first surface, wherein the distance between said focused light source and said first surface at the second calibration position is a second distance; and
    determining a calibration distance corresponding to a difference between said first distance and said second distance.

24. The method of claim 23, further comprising blocking a light signal reflected from a secondary surface of said object.

25. The method of claim 23, wherein the focused light source comprises a laser diode.

26. The method of claim 24, wherein the focused light source further comprises a converging lens.

27. The method of claim 23, wherein generating an output value based on said first and second intensities comprises:
   subtracting a first voltage signal corresponding to said first intensity from a second voltage signal corresponding to a second intensity; and
   adding a bias voltage to said subtracted signal.

28. The method of claim 23, wherein the intensity of the second portion of the unblocked reflected light signal is zero.

29. The method of claim 23, wherein the mathematical critical point in said generated output value corresponds to a maximum in said generated output value as a function of distance between said focused light source and said first surface.

30. The method of claim 23, wherein the mathematical critical point in said generated output value corresponds to a minimum in said generated output value as a function of distance between said focused light source and said first surface.

31. The method of claim 23, wherein the first detector element and the second detector element comprise a bicell detector.

32. The method of claim 23, wherein the first detector element and the second detector element comprise detector elements of a quadrant detector.

33. The method of claim 23, wherein the first detector element and the second detector element comprise detector elements within a position sensitive detector.

34. The method of claim 23, wherein said object is a substantially planar substrate.

35. The method of claim 23, wherein said object is a substrate that is at least partially transparent to said incident focused light signal.

36. The method of claim 23, wherein said first distance comprises a distance between said first surface and a focal point of said focused light source.

37. The method of claim 23, wherein the steps of the method are performed in the order set forth in the claim.

38. A method for automatically focusing an optical measurement tool on a surface of an object, comprising:
   calibrating an optical measurement tool having an optical head to identify a calibration distance;
   transmitting an incident focused light signal from the optical head toward a first surface of an object;
   blocking at least a portion of a reflected light signal reflected from said first surface of said object;
   detecting a first intensity at a first detector element corresponding to a first portion of the unblocked reflected light signal;
   detecting a second intensity at a second detector element corresponding to a second portion of the unblocked reflected light signal;
   generating an output value based on said first and second intensities;
   moving said optical head relative to said first surface to a position corresponding to a mathematical critical point in the value of said generated difference signal as a function of the relative position of said optical head and said first surface; and
   translating said optical head toward said first surface by said calibration distance.

39. The method of claim 38, further comprising adjusting the position of said first surface during said moving of said optical head relative to said first surface.

40. A method for automatically focusing an optical measurement tool on a surface of an object, comprising:
   calibrating an optical measurement tool having an optical head to identify a calibration distance;
   transmitting an incident focused light signal from said optical head toward a first surface of an object;
   blocking at least a portion of a reflected light signal reflected from said first surface of said object;
   detecting a first intensity at a first detector element corresponding to a first portion of the unblocked reflected light signal;
   detecting a second intensity at a second detector element corresponding to a second portion of the unblocked reflected light signal;
   generating an output value based on said first and second intensities;
   moving said first surface relative to said optical head to a position corresponding to a critical point in the value of said generated difference signal as a function of the relative position of said first surface and said optical head; and
   translating said optical head toward said first surface by said calibration distance.

41. The method of claim 40, further comprising adjusting the position of said optical head during said moving of said first surface relative to said optical head.

* * * * *